Feb. 15, 1944.  J. C. CROWLEY  2,341,598
FASTENING DEVICE
Filed Feb. 24, 1943  2 Sheets-Sheet 1

INVENTOR.
JOHN C. CROWLEY
BY
Kwis Hudson & Kent
ATTORNEYS

Feb. 15, 1944.   J. C. CROWLEY   2,341,598
FASTENING DEVICE
Filed Feb. 24, 1943   2 Sheets-Sheet 2

INVENTOR.
JOHN C. CROWLEY
BY
Kwis Hudson & Kent
ATTORNEYS

Patented Feb. 15, 1944

2,341,598

UNITED STATES PATENT OFFICE 2,341,598

FASTENING DEVICE

John C. Crowley, Cleveland Heights, Ohio, assignor to The Dill Manufacturing Company, Cleveland, Ohio, a corporation of Ohio Application February 24, 1943, Serial No. 476,894

9 Claims. (Cl. 85—40)

This invention relates to a fastening device and particularly to a fastening device which is especially useful where access can be had to only one side of the member or element to which the fastening device is to be applied.

One situation wherein a fastening device embodying the invention has particular practical utility is in the building or repairing of airplanes wherein many instances are present requiring the fastening of a plate or other member on the outer side of another plate or member and where the plates are not accessible from both sides and the fastening device can be inserted from one side only of the plates.

The fastening device can be employed as a rivet to secure plates together or it can be employed to provide points of attachment for various parts which are to be secured to a structural member and where access can be had to only one side of the member. As illustrative of certain uses of the fastening device to form points of attachment reference is made to the securing of fillet plates in position at the junction of the wings and fuselage and at other points to streamline an airplane or to the attaching of instruments or other devices at various points on or in the plane structure.

An object of the invention is to provide a fastening device of the type specified and which device is especially suitable for use in plywoods and plastics and when applied will not damage or deform the plywoods or plastics.

A further object of the invention is to provide a fastening device of the character referred to and wherein that part of the device which is secured or clamped to the wall member, panel, plate or other element is separate from the part of the device that is threaded to receive an attaching screw, wherefore the latter part may be removed for replacement purposes without disturbing the first mentioned part and when an attaching screw is turned tightly into said latter part the turning force applied to said attaching screw will not be directly transmitted to the first part and cause the latter to turn or rotate which might destroy the clamping efficiency of the first mentioned part on the member, panel, plate or other element.

Another object of the invention is to provide a fastening device of the character referred to and wherein the part of the device which is clamped to a wall panel or other element can be left in clamped position although the other elements of the device are removed from said part, with the result that said other elements can be replaced with like elements if desirable or necessary or a different form of attaching device can be mounted in the part that remains clamped to the member, wall or panel.

A further object of the invention is to provide a fastening device of the character specified which can be readily applied to a wall, plate or panel from one side only thereof by what might be termed a "blind" application and which device is so constructed that the tool used in its application does not engage the internal threads of the part which is to receive an attaching screw, thereby obviating the danger that said internal threads might be damaged during the application of the fastening device.

Another object is to provide a fastening device of the character specified, which is simple in design, can be economically manufactured, is readily applied and is efficient in operation.

Further and additional objects and advantages residing in or resulting from the use of a fastening device embodying the invention will become apparent hereinafter during the detailed description which is to follow of several embodiments of the invention.

Referring to the accompanying drawings.

Figure 4:
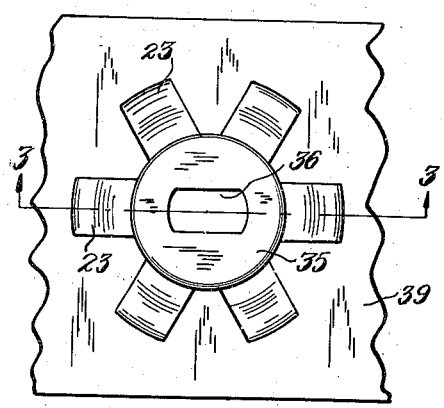
Fig. 4 is a plan view taken looking from the top of Fig. 3.
Figure 8:
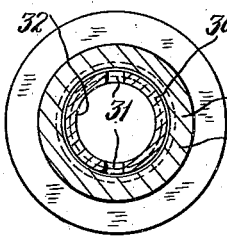
Fig. 8 is a transverse sectional view taken substantially along line 8—8 of Fig. 2 looking in the direction of the arrows.

Although the fastening device embodying the present invention may be used in various environments and in connection with metal, plywood or plastic structures, it will be described herein as employed in a plywood structure, and particularly in a plywood airplane construction. However, it should be understood that the description of the use of the device in a plywood airplane structure is simply for purposes of illustration and not by way of limitation.

The fastening device shown in Figs. 1 to 8, inclusive, comprises an outer part which may be defined as a bushing 20, having at one end an annular flange or head 21. The bushing 20 is preferably formed of thin gauge metal and is provided intermediate its ends with a plurality of circumferentially spaced longitudinally extending slots 22. The slots 22 extend throughout the major length of the bushing as shown in the drawings and provide longitudinally extending circumferentially spaced legs 23 therebetween which are integrally connected at their opposite ends with unslotted portions of the bushing. The legs 23 intermediate their ends and as illustrated substantially midway of the legs are provided with grooves or recesses 24 extending circumferentially of the legs and the interior of the bushing and provide a weakened zone at which point the legs will bend or collapse laterally and outwardly. The annular flange or head 21 of the bushing is provided on its outer side with a plurality of radially extending spaced V-shaped notches 25 for a purpose later to be explained, see Figs. 6 and 7.

The fastening device also includes an inner part which will be designated herein as the lock screw. This inner part comprises a cylindrical portion 26 having at one end an annular flange or head 27 provided on its inner side with a plurality of radially extending spaced V-shaped ridges 28 which cooperate with the V-shaped notches 25 of the head 21 of the bushing when the parts are assembled, as will later be pointed out. The cylindrical portion 26 of the lock screw is provided with external threads 29 from a point adjacent to the head 27 to the inner end of the reduced end portion 30 of the lock screw. The reduced end portion 30 of the lock screw is provided with diametrically aligned axially extending slots 31 which form said end 30 into two arcuate spring-like portions. The lock screw 26 is provided with internal threads 32 which extend from the head 27 to the opposite end of the lock screw and completely throughout the interior thereof including the interior of the reduced end portion 30. The threads 32 are for the purpose of receiving an attaching screw (not shown), as will later be pointed out. The head 27 of the lock screw is provided on its outer side at diametrically opposite points of the bore through the lock screw with notches, openings or recesses 33 for a purpose later to be explained.

The third part of the fastening device is in the form of a sleeve 34, one end of which is closed as indicated at 35, except for a diametrically extending elongated slot 36 which is for a purpose later to be explained. The sleeve 34 is provided with a bore which is threaded, as indicated at 37, from the open end of the sleeve substantially to the opposite end of the bore.

The parts of the fastening device are assembled in the following manner: The lock screw 26 is passed freely through the bushing 20 from the head end thereof, wherefore the head 21 of the bushing and the head 27 of the lock screw are located adjacent to each other. The lock screw is of such length that it will extend through the bushing when the head 27 is closely adjacent to the head 21 and a portion of the exterior threads 29 of the lock screw will be exposed beyond the outer end of the bushing. The open end of the sleeve 34 is then passed over the reduced end 30 of the lock screw and the interior threads 37 of the sleeve are engaged with the exterior threads 29 of the lock screw and the sleeve is screwed inwardly upon the lock screw until it is substantially in engagement with the inner end of the bushing 20 as indicated in Figs. 1 and 2.

Figure 3:
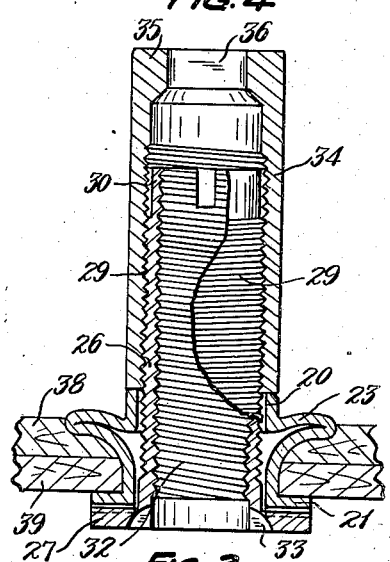
Fig. 3 is a view similar to Fig. 2 but illustrates the device after the lock screw has been tightened and the clamping part or member of the device collapsed or clamped against the plywood, the latter being indicated in this view in full lines, said view being taken substantially along line 3—3 of Fig. 4 looking in the direction of the arrows.
Figure 2:
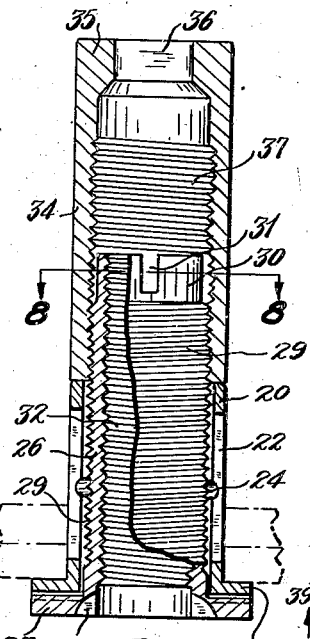
Fig. 2 is a longitudinal transverse sectional view through the device shown in Fig. 1, with a portion of the lock screw of the device shown in elevation and the device shown in position extending through an opening in two layers or plies of plywood, with the latter indicated by dot and dash lines.
Figure 1:
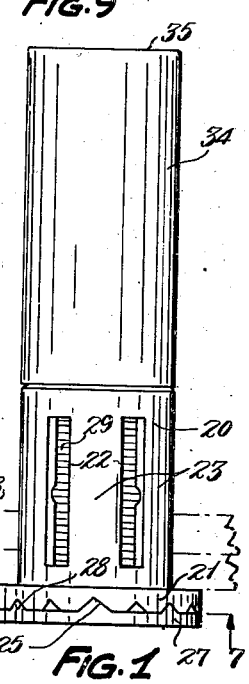
Fig. 1 is an elevational view of a fastening device embodying the invention and on an enlarged scale and shows the device extending through an opening formed in a piece of two layer plywood, with the latter indicated by dot and dash lines.
Figure 5:
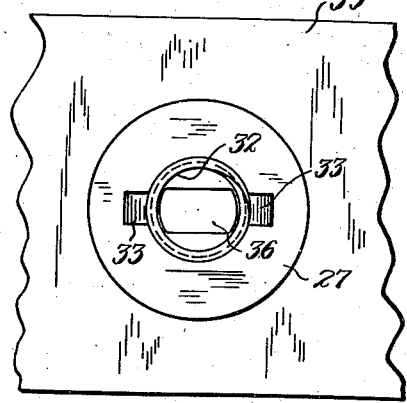
Fig. 5 is a plan view taken looking from the lower side of Fig. 3.
Figure 6:
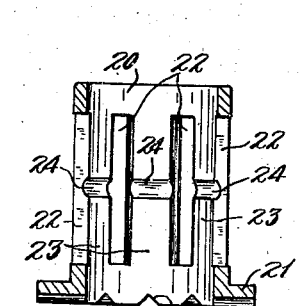
Fig. 6 is a detail longitudinal sectional view through the part or element of the device which is collapsed or clamped into the opening through the wall member or panel to which the device is secured, and shows said part before it is collapsed.
Figure 7:
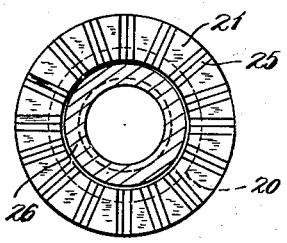
Fig. 7 is a transverse sectional view taken substantially on line 7—7 of Fig. 1 looking in the direction of the arrows.
Figure 16:
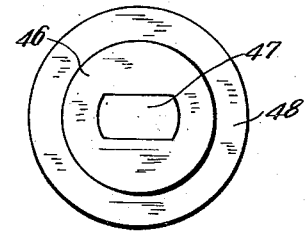
Fig. 16 is a plan view of the outer part of the fastening device and is taken looking from the upper end of Fig. 15.
Figure 13:
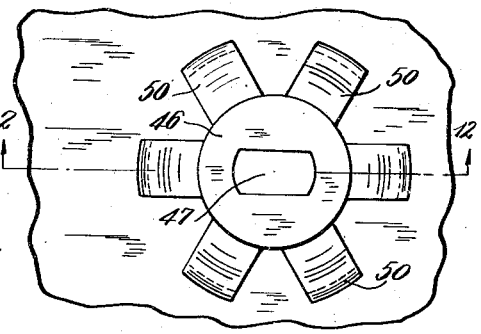
Fig. 13 is a plan view looking from the upper end of Fig. 12.
Figures 10, 11:
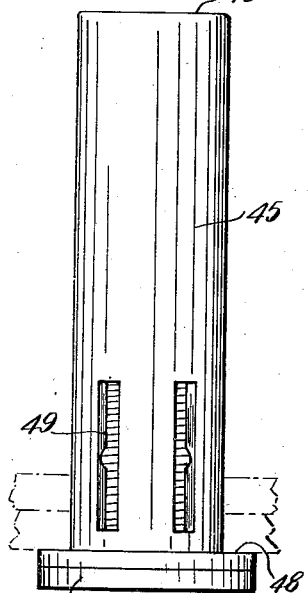
Fig. 10 is a view similar to Fig. 1 but shows a modified form of fastening device embodying the invention.
Fig. 11 is a view similar to Fig. 2 but illustrates partly in section and partly in elevation the modified form of device shown in Fig. 10.

The assembled fastening device can be employed similarly to a rivet to secure together two sheets of material, such as the two plies 38 and 39 of plywood shown in Figs. 1 to 3, inclusive, or it can be used to provide a point of attachment in the plywood for some other device as, for example, a fillet plate which might be secured in position at the juncture of the wings and fuselage or at other points to streamline an airplane or as an attaching point for an instrument or other element. The fastening device will be described herein in connection with its use to provide an attaching point for such other device or element, and particularly where access can be had to only one side of the wall or panel to which the fastening device is applied. The wall or panel formed of the two plies of wood 39 and 38 is provided with an opening therethrough extending from the accessible side of the ply 39 inwardly and through the ply 38. The assembled fastening device is mounted in the opening by passing the bushing 20 and sleeve 34 with the lock screw arranged therein through the opening until the head 21 of the bushing contacts the accessible side of the ply 39. A suitable tool is then employed for collapsing the bushing 20 to tightly lock or clamp the same in the opening as will be more fully explained. This tool should include two relatively rotatable members one of which extends through the fastening device and engages in the slot 36 of the closed end of the sleeve 34 and the other of which is provided with a screwdriver portion engaging the notches 33 in the head 27 of the lock screw, wherefore it will be seen that relative rotation between the members of the tool will effect relative rotation between the lock screw and the sleeve 34. As an example of a suitable form of tool for this purpose reference is made to Anderson Patent No. 2,254,130, August 26, 1941, which discloses a form of tool that could be adapted for this purpose. The relative rotation imparted by the tool to the lock screw 26 and the sleeve 34 and in the proper direction will cause the sleeve to screw farther upon the external threads 29 of the lock screw toward the head end thereof and exert an axial force against the end of the bushing 20. Such force exerted against the end of the bushing 20 will first cause the legs 23 to bend or collapse laterally outwardly at the weakened zone formed by the grooves 24 and continued application of this endwise force will collapse the legs 23 farther until they are in the position indicated in Figs. 3 and 4, at which time the wall or panel will be tightly clamped or gripped between the head 21 and the collapsed legs 23 of the bushing and the collapsed bushing securely locked in position in the opening through the wall or panel.

It will be noted that the tool used in applying the device and collapsing the bushing does not contact with the internal threads 32 of the lock screw, and hence does not cause an injury thereto. As the device is applied and the bushing collapsed, the latter exerts a spring force or pressure against the sleeve 34 in an axial direction and the internal threads 37 of the sleeve are interlocked with the external threads 29 of the lock screw, and hence does not cause any injury therebetween. When the device has been tightly applied the sleeve 34 and the lock screw 26 are thus held against undesired relative rotation due to vibration or other causes. During the final part of the application of the device the ridges 28 on the head 27 of the lock screw will ride into and out of the V-shaped grooves 25 of the head 21 of the bushing with a ratchet-like action and when the device is fully applied said ridges 28 will cooperatively engage the grooves 25, wherefore the lock screw 26 and the sleeve 34 are held against undesired rotation relative to the bushing. The collapsed legs 23 of the bushing and the head 21 thereof engage the opposite sides of the wall panel or member to which the device is attached over a relatively large area, and since the legs and the head present no sharp edges the collapsed bushing although tightly gripping the opposite sides of the wall or panel will not substantially deform or injure the same, especially when the wall or panel is formed of material other than metal, such as plywood or plastic materials.

When the fastening device is employed as an attaching point for connecting some other element or device to the wall or panel, such, for example, as fillet plates or instruments as previously referred to, an attaching screw (not shown) is screwed into the interior threads 32 of the lock screw 26. In this connection it will be noted that the lock screw is separate from the collapsed bushing and passes freely through the same and therefore the tightening of the attaching screw in the lock screw will not cause rotation of the collapsed bushing and which rotation might result in loosening the clamped bushing or in deforming or injuring the wall or panel.

It will further be noted that the lock screw 26 can be removed from the collapsed bushing by unscrewing the lock screw from the sleeve 34 without affecting the clamped condition of the collapsed bushing in the opening of the wall or panel. This is an important advantage since in case the internal threads 32 of the lock screw are damaged or in connection with repair work the lock screw can be removed and replaced. Of course in those situations where access can be had to only one side of the wall or panel the removal of the lock screw results in the sleeve 34 falling off the end of the screw when the two parts have been sufficiently unscrewed relative to each other. In this latter situation the same form of lock screw and sleeve could not be replaced in the collapsed bushing. However, the collapsed bushing will act as an eyelet which will receive and hold in position another form of means for taking the attaching screw.

Figure 9:
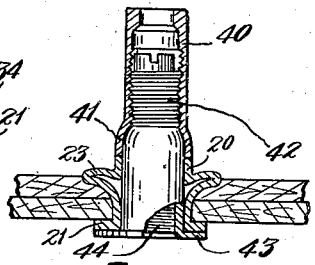
Fig. 9 is a view partly in section and partly in elevation and on a reduced scale as compared with the other views and shows the part of the fastening device which is clamped or collapsed into locked position in the opening and into which part a different form of attachment device has been secured after the original lock screw has been removed therefrom.

As an example of such a means reference is made to Fig. 9, wherein an expansible fastening device similar to the fastening shown in Anderson Patent No. 2,051,066, August 18, 1936, is shown mounted in the collapsed bushing. This Anderson fastening device comprises an outer part 40 in the form of a sleeve or thimble and of such diameter that it can be passed through the eyelet formed by the collapsed bushing 20. The part 40 is somewhat similar to the sleeve 34 of the present fastening device in that it has a closed end provided with the tool receiving slot. The opposite end of the member 40 is expansible for a portion of the length of the same, as indicated at 41, while intermediate the closed end and the expansible end the member 40 is interiorly threaded. The other member or part of the Anderson fastening comprises an exteriorly threaded shank 42 terminating in an enlarged conical shoulder which when said other member is screwed fully into the member 40 acts to expand the expansible portion 41 thereof. The outer end of said other member of the Anderson fastening is provided with an enlarged head or flange 43 while said member is interiorly threaded, as indicated at 44, to receive an attaching screw. It will be understood that when the Anderson fastening is employed the same can be passed from the accessible side of the wall or panel through the eyelet formed by the collapsed bushing and then by means of a suitable tool the parts or members of the fastening are relatively rotated to expand the portion 41 of the member 40 and bring the expanded end of the latter into tight holding engagement with the inner end of the bushing 20, as shown in Fig. 9. When the Anderson fastening has been thus secured in the bushing an attaching screw can be screwed into the interior threads 44 thereof and a fillet plate, instrument or other device or element secured to the wall or panel.

In Figs. 10 to 16, inclusive, there is disclosed a modified form of the fastening device from that shown in Figs. 1 to 8, inclusive. The modified form of fastening device differs from the first described form in that the collapsible bushing 20 and the sleeve 34 of the first form are made integral in the second form.

Figure 12:
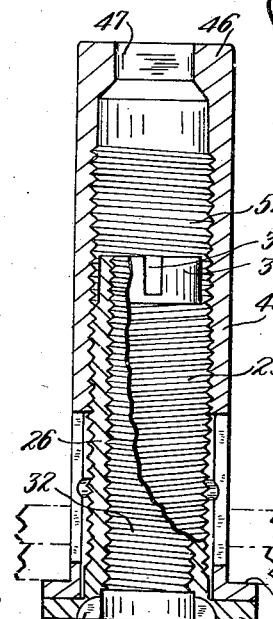
Fig. 12 is a longitudinal view partly in section and partly in elevation of the fastening device shown in Figs. 10 and 11 and shows the relationship of the parts of the device when the outer part thereof has been collapsed into clamped or locked position in the opening through the wall or panel, said view being taken substantially along line 12—12 of Fig. 13 looking in the direction of the arrows.
Figure 14:
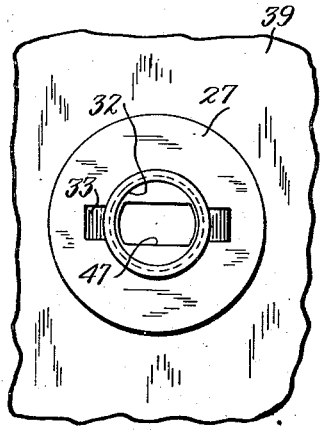
Fig. 14 is a plan view looking from the lower side of Fig. 12.
Figure 15:
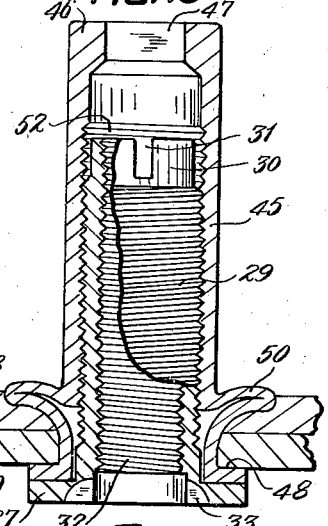
Fig. 15 is a detail longitudinal sectional view through the outer part of the fastening device shown in Fig. 10 and before said part is collapsed.

Referring to Figs. 10 to 16, inclusive, the fastening device shown therein comprises a cylinder 45 having a closed end 46 provided with a diametrically extending slot or opening 47 and an open end provided with an annular flange 48. The cylinder 45 adjacent the flange 48 is provided with circumferentially spaced longitudinally extending slots 49 forming therebetween longitudinally extending circularly spaced legs 50 corresponding to the legs 23 of the bushing 20 of the first mentioned form of fastening device. The cylinder 45 intermediate the ends of the legs 50 is provided internally with a circular groove 51 forming a weakened zone or point at which the legs 50 will bow or collapse laterally outwardly when the fastening device is applied to a wall or panel. The lock screw of the modified form of fastening device is identical with the lock of the first mentioned form and the same reference characters as those used in describing the first mentioned form of lock screw are used in the modified form. The application of the modified form of fastening device is made in the same way as is the application of the first described form of device, it being understood that when the lock screw 26 is screwed into the cylinder 45 the legs 50 of the cylinder will be collapsed into clamping position as indicated in Fig. 12.

It will be noted in connection with the modified form of device that the spring action of the collapsed legs 50 serves to interlock the internal threads 52 of the cylinder with the external threads 29 of the lock screw 26 and to thus hold said elements against unintentional relative rotation. In the event that the interior threads 32 of the lock screw of the modified form of fastening device become damaged or it is desired or necessary to replace the lock screw with a new one it is merely necessary to unscrew the lock screw from the cylinder 45 and to then screw into the cylinder a new lock screw which will receive the attaching screw used to secure a fillet plate, instrument or other device to the wall or panel. When the lock screw is removed from the cylinder 45 the latter remains clamped in the opening in the wall or panel.

Although preferred embodiments of the invention have been illustrated and described herein it should be understood that the invention is susceptible of various modifications and adaptations within the scope of the appended claims.

Having thus described my invention I claim:

1. A fastening device of the character described comprising a tubular member provided at one end with a laterally extending flange and having a portion located a predetermined distance outwardly of said flange and laterally collapsible under axial pressure towards said flange, internally threaded means operatively associated with said member outwardly of said portion, and a screw extending into said member and screwing into said means to cause the latter to exert axial pressure on said portion of said member and toward said flange, said screw being provided with a threaded bore and serving as a nut adapted to receive an attaching screw.

2. A fastening device of the character described comprising a tubular member provided at one end with a laterally extending flange and having intermediate its ends a plurality of peripherally spaced longitudinally extending slots forming legs therebetween and which legs are laterally and outwardly collapsible under axial pressure toward said flange, internally threaded means operatively associated with said member beyond said legs, and a screw extending into said member and screwed into said means for causing the latter to exert said axial pressure on said legs and collapse the same, said screw being provided with a threaded bore and acting as a nut adapted to receive an attaching screw.

3. A fastening device of the character described comprising a tubular member provided at one end with a laterally extending flange and having intermediate its ends a plurality of peripherally spaced longitudinally extending slots forming legs therebetween, said member being provided interiorly thereof and intermediate the ends of said legs with a groove forming a predetermined weakened zone at which point said legs will bend laterally outwardly under axial pressure directed toward said flange, internally threaded means operatively associated with said member outwardly of said legs, and a screw extending into said member and screwed into said means to cause the latter to exert said axial pressure on said legs, said screw being provided with a threaded bore acting as a nut adapted to receive an attaching screw.

4. A fastening device of the character described comprising a member provided at one end with a laterally extending flange and having a portion located at a predetermined point outwardly of said flange and laterally collapsible under axial pressure directed toward said flange, a screw passing freely through said member from the flange end and beyond the opposite end thereof, and an internally threaded member separate from said first named member and into which said screw is screwed and abutting against said opposite end of said first named member whereby relative rotation between said screw and second named member will cause the latter to exert axial pressure on said opposite end of said first named member and collapse said portion thereof.

5. A fastening device as defined in claim 4 and wherein said screw is provided with a threaded bore and acts as a nut adapted to receive an attaching screw.

6. A fastening device of the character described comprising a tubular member provided at one end with a laterally extending flange and outwardly of said end having a plurality of peripherally spaced longitudinally extending slots forming legs therebetween which are outwardly laterally collapsible under axial pressure on said member and directed towards said head, a screw passing freely through said member from its flange end and extending beyond the opposite end thereof, and an internally threaded member separate from said first named member and abutting against said opposite end of the first member and into which is screwed said screw to cause said second member upon relative rotation between it and said screw to exert axial pressure on said opposite end of said first member to collapse said legs.

7. A fastening device as defined in claim 6 and wherein said screw is provided with a threaded bore and acts as a nut adapted to receive an attaching screw.

8. A fastening device of the character described comprising a tubular member provided at one end with a laterally extending flange and having adjacent said end a portion which is laterally outwardly collapsible under axial pressure directed toward said flange, said member beyond said portion being internally threaded, and a screw inserted into said member from the flange end thereof and passing freely through said collapsible portion and screwed into the internally threaded portion of said member wherefore relative rotation between said member and screw will cause said axial pressure to be exerted upon said collapsible portion, said screw being provided with a threaded bore and acting as a nut adapted to receive an attaching screw.

9. A fastening device of the character described comprising a tubular member provided at one end with a laterally extending flange and having adjacent said end a plurality of peripherally spaced longitudinally extending slots forming therebetween legs which are laterally collapsible outwardly under axial pressure directed toward said flange, said member beyond said legs being provided with an internally threaded portion, and a screw inserted into said member from the flange end thereof and passing freely therethrough beyond said legs and screwed into said internally threaded portion of the member wherefore relative rotation between said screw and said member will cause said axial pressure to be exerted on said legs to collapse the same, said screw having a threaded bore and acting as a nut adapted to receive an attaching screw.

JOHN C. CROWLEY.